(12) United States Patent
Vukovich et al.

(10) Patent No.: US 6,644,939 B2
(45) Date of Patent: Nov. 11, 2003

(54) METHOD AND APPARATUS FOR PROVIDING A HYDRAULIC TRANSMISSION PUMP ASSEMBLY HAVING A DIFFERENTIAL ACTUATION

(75) Inventors: William Vukovich, White Lake Township, MI (US); Mark R. Buchanan, Rochester Hills, MI (US)

(73) Assignee: BorgWarner, Inc., Auburn Hills, MI (US)

( * ) Notice: Subject to any disclaimer, the term of this patent is extended or adjusted under 35 U.S.C. 154(b) by 159 days.

(21) Appl. No.: 09/932,335

(22) Filed: Aug. 17, 2001

(65) Prior Publication Data

US 2003/0035742 A1 Feb. 20, 2003

(51) Int. Cl.[7] ............................... F04B 17/00
(52) U.S. Cl. .................................... 417/374
(58) Field of Search ................ 417/374, 410.5, 417/319, 16, 223

(56) References Cited

U.S. PATENT DOCUMENTS

| 4,540,347 A | 9/1985 | Child .................... 417/310 |
| 4,747,744 A | 5/1988 | Dominique et al. ........ 417/420 |
| 4,976,594 A | 12/1990 | Bernstrom ................. 418/61.3 |
| 5,261,803 A | 11/1993 | Freeman ..................... 418/171 |
| 5,395,217 A | 3/1995 | Hoffmann et al. .......... 417/362 |
| 5,476,374 A | 12/1995 | Langreck .................... 418/171 |
| 5,554,019 A | 9/1996 | Hodge ........................ 418/171 |
| 6,234,769 B1 * | 5/2001 | Sakai et al. ................. 417/374 |
| 6,258,001 B1 * | 7/2001 | Wakuta et al. ................. 475/5 |
| 6,340,339 B1 * | 1/2002 | Tabata et al. .................. 475/5 |
| 6,375,436 B1 * | 4/2002 | Irie et al. .................... 417/223 |
| 6,443,712 B2 * | 9/2002 | Sakai et al. ................. 417/374 |
| 6,554,113 B2 * | 4/2003 | Li et al. .................... 192/48.92 |

* cited by examiner

Primary Examiner—Henry Bennett
Assistant Examiner—Vinod D Patel
(74) Attorney, Agent, or Firm—Bliss McGlynn, P.C.; Greg Dziegielewski

(57) ABSTRACT

A hydraulic transmission pump assembly including a pump, an electric motor operatively coupled to the pump, and a differential gear assembly interposed between the two. The differential gear assembly acts to divide engine torque between the pump and the electric motor at engine speeds above a predetermined level thereby providing fluid under pressure to the transmission and driving the electric motor to generate electricity; the electric motor also being operable to drive the pump at engine speeds below the predetermined level thereby providing fluid under pressure to the transmission during this operating condition.

20 Claims, 2 Drawing Sheets

METHOD AND APPARATUS FOR PROVIDING A HYDRAULIC TRANSMISSION PUMP ASSEMBLY HAVING A DIFFERENTIAL ACTUATION

FIELD OF THE INVENTION

The present invention relates generally to a hydraulic transmission pump assembly and, more specifically, to a method and apparatus for providing a hydraulic transmission pump assembly having differential actuation that supplies hydraulic power to a vehicle transmission.

DESCRIPTION OF THE RELATED ART

Generally speaking, land vehicles require a powertrain consisting of three basic components. These components include a power plant (such as an internal combustion engine), a power transmission, and wheels. The power transmission component is typically referred to simply as the "transmission." Engine torque and speed are converted in the transmission in accordance with the tractive-power demand of the vehicle.

Transmissions generally include one or more gear sets. One type of gear set commonly employed in automatic transmissions is a planetary gear set, named for the relative rotation of the "planet gears" that each rotate on their individual axis while revolving around a "sun gear". Planetary gear sets are made up of three components, all in constant mesh; a sun gear, a planetary carrier with planet gears, and a surrounding ring gear or internal gear. When one component is held stationary, and another component is rotated, the third component is driven at either a reduction, or an increase in speed, or a rotation in the opposite direction. The planetary gear sets that are commonly used in today's automatic transmissions are actually "compound planetary gear sets" because they are basically two planetary sets that have common parts. Most 3-speed transmissions, for example, use two ring gears, two planetary carriers, and a common sun gear that is axially long enough to mesh with both planetary carriers. By changing which components are rotated by the engine, and which components are "held", two different gear reductions (1st gear, and 2nd gear) and reverse, as well as a 1:1 ratio (third gear) can be obtained. Thus transmissions typically include a plurality of clutch or brake assemblies that are employed as holding mechanisms in the transmission.

One example of a device used as a "holding" mechanism in a transmission is a one-way clutch. One-way clutches have inner and outer races that allow relative rotation of the two races in one direction but lock together in the opposite rotational direction. In application, when the races are fixed on concentric shafts, the shafts will be held together in one rotational direction, and be able to freewheel in the other rotational direction.

Multi-disk pack friction clutches are another example of a clutch assembly that is commonly employed for this purpose in a transmission. The multi-disk pack friction clutch or brake assembly usually employs a clutch subassembly including a set of plates and a set of friction disks that are interleaved between one another. The plates and friction disks are bathed in a continual flow of lubricant. The clutch or brake assembly also typically includes an actuating piston. When a component of a gear set is to be held, as for example during a particular gear change, a piston is actuated so as to cause the plates and friction disks to come into contact with respect to one another. In certain applications, it is known to employ several one-way clutches or multi-disk pack friction devices in combination to establish different drive connections throughout the transmission to provide various gear ratios in operation, or to brake a component. Thus, it is necessary to provide lubrication to the gear sets and the holding and shifting devices within the transmission in order to ensure their smooth and efficient operation while avoiding undue wear. Additionally, the lubrication functions to remove excess heat and cool the internal components of the transmission to within acceptable designed operating temperatures.

Within the transmission, the multi-disk friction clutches, brake systems, and gear sets have traditionally relied on a continuous "splash" supply of coolant, typically an oil, known generally as automatic transmission fluid (ATF), to remove the heat generated during operation and lubricate various moving parts. To this end, the transmission typically includes a hydraulic pump that provides ATF under pressure to supply various components with the fluid pressure necessary to actuate, lubricate and cool such components. The transmission pump is powered by the vehicle's engine through some manner of connection with an input shaft. The pump draws ATF from a reservoir, or sump, through a filter. The ATF pressure is typically regulated by means of a solenoid-actuated regulator valve. The solenoid actuates a valve member to produce a bias pressure in the main transmission pressure line based on a command voltage received from a control module. In this way, the fluid pressure and flow in the main transmission pressure line are regulated to a desired value. Alternatively, some transmissions employ a less complex mechanical spring biased pressure regulator for the same purpose.

By having the pump driven by a power input of the vehicle's engine, the resulting ATF fluid flow from the pump through the transmission main line, in both pressure and quantity, is proportional, or "linear", with respect to engine speed. Conversely, the transmission generally requires ATF at constant volume and pressure across its operating range. Since conventional transmission pumps are driven by the vehicle engine, the conventional transmission pump and its mechanical drive components are sized so as to meet all possible lubrication, actuation and cooling requirements of the transmission when the engine, and thereby the pump mechanism, is at idle. Thus, whenever the engine speed is elevated above idle, the transmission pump produces a greater volume and pressure of ATF than is required and the supply of ATF is excessive. This excess amount of ATF flow is simply returned to the sump, by the regulator valve, as wasted energy. This wasted energy is an unnecessary mechanical loss that drains power from the engine, reducing transmission and overall vehicle efficiency.

Looking further ahead to new technological advances in automotive design, hybrid vehicles with multiple power sources and multiple power transfer operating modes are emerging. Hybrid vehicle designs can provide both low emissions and improve fuel economy. In order to do this, some hybrid vehicle designs switch drive modes between electrical power and conventional engines in such a manner that the internal combustion engine may be below a standard, or conventional idle speed, or off, at times during vehicle operation. This could occur when there is no forward movement of the vehicle (e.g., at a stoplight), or when the vehicle is coasting, or when driven solely by the electrical power source. This highlights another disadvantage in conventional transmission pump designs; namely, with the internal combustion engine at a below idle condition, there is little, or no, ATF flow. Thus, there is a need in the art to meet the lubrication, cooling and actuation requirements of the transmission in a hybrid vehicle during these operating conditions.

This drawback to the conventional automatic transmission pump can also be seen in conventional vehicles in one other specific instance. If the engine is off in a conventional vehicle, yet the vehicle's drivetrain is moving, for example where a vehicle is being towed, there is no ATF lubrication being provided to the bearings and gear sets of the transmission. Simply towing the vehicle could cause damage to the internal workings of the transmission itself.

In light of the above, those having ordinary skill in the art will appreciate that specific disadvantages to conventional transmission ATF pump construction and operation exist. The first being the excessive ATF flow delivery for engine speeds at or above idle, which results in a drain to the engine's power resources and second, the inability of conventional designs to adequately supply the transmission with ATF during engine off or below idle conditions. These disadvantages create the need for a transmission pump design that is both more efficient and is able to operate when the vehicle's engine is below idle, off, or otherwise disconnected, but transmission and thereby vehicle operation is required.

SUMMARY OF THE INVENTION AND ADVANTAGES

The hydraulic transmission pump assembly of the present invention overcomes the disadvantages in the related art as a pump adapted to provide fluid under pressure to predetermined components in a transmission. The hydraulic transmission pump assembly includes an electric motor operatively coupled to the pump and a differential gear assembly interposed between an engine and the electric motor. The differential gear assembly acts to divide engine torque between the pump and the electric motor at engine speeds above a predetermined level thereby providing fluid under pressure to the transmission and driving the electric motor to generate electricity. The electric motor is operable to drive the pump at engine speeds below the predetermined level thereby providing fluid under pressure to the transmission during this operating condition.

The present invention is also directed toward a method of providing hydraulic power to an automotive transmission. The method includes the steps of providing a pump which is operatively actuated about a central axis as defined by a common driven shaft, providing an electric motor which is electrically connected to the electrical system of an automobile, and providing a differential gear assembly interposed between a power input and the electric motor. The method also includes the steps of controlling the operation of the differential gear assembly such that the differential gear assembly causes the pump to be driven by the electric motor when the automotive engine is operating below a predetermined RPM, and controlling the differential gear assembly such that it causes both the pump and the electric motor to be driven by the power input when the automotive engine is operating above a predetermined RPM such that the electric motor functions as a generator to provide electric power back to the automobile electrical system during specific times of motor vehicle operation.

Therefore, the present invention overcomes the drawbacks and disadvantages of the related art, which cannot provide the proper ATF flow to the transmission when the vehicle engine is off or below idle speed. Additionally, the present invention is more efficient than the prior art as it provides the required, regulated ATF flow anytime the engine is at idle or above, while concurrently converting any excess applied engine power into usable electrical energy that is fed back to the vehicle electrical system.

DETAILED DESCRIPTION OF THE PREFERRED EMBODIMENT(S)

Figure 1:
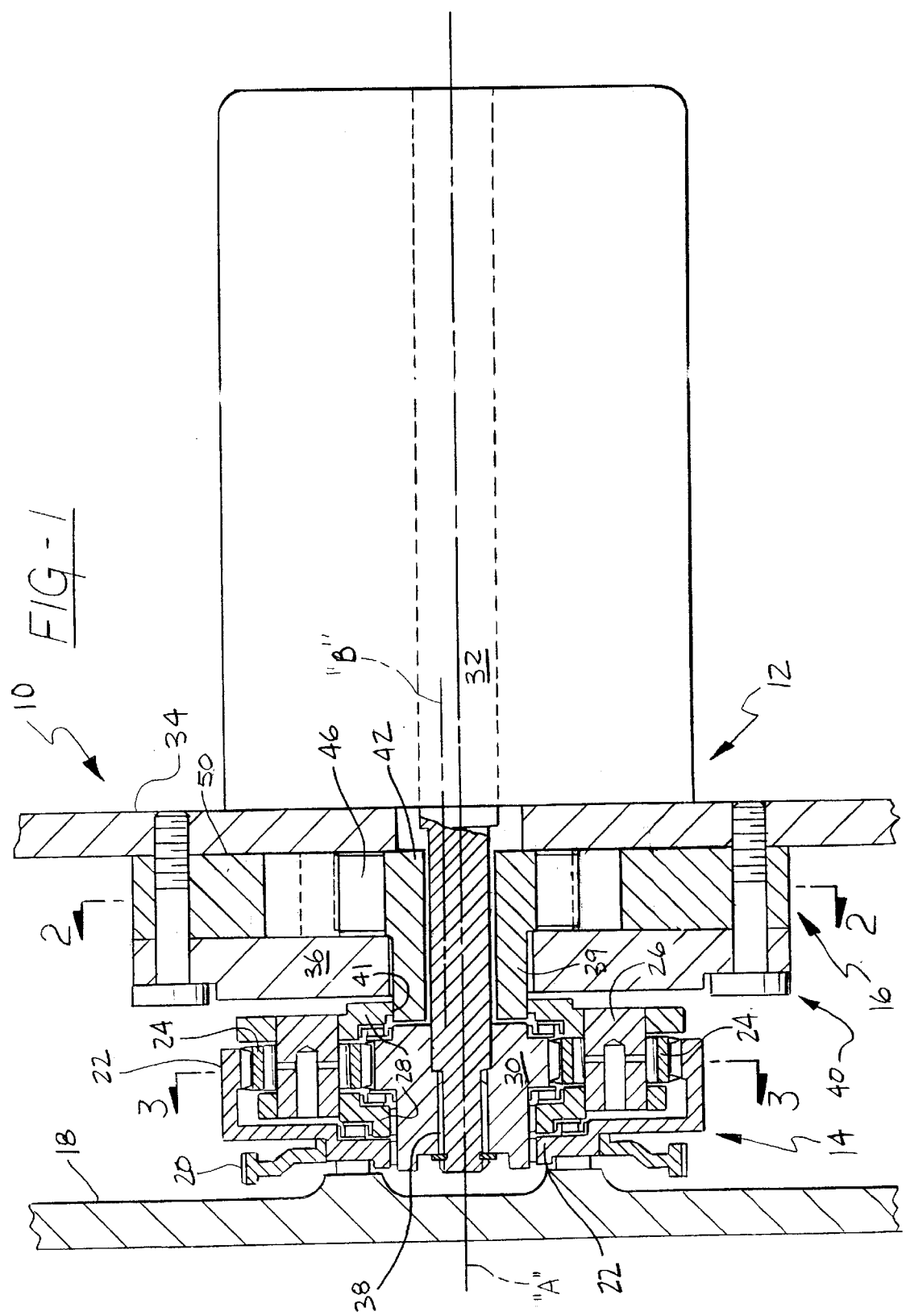
FIG. 1 is a side view of the hydraulic transmission pump assembly of the present invention.
Figure 3:
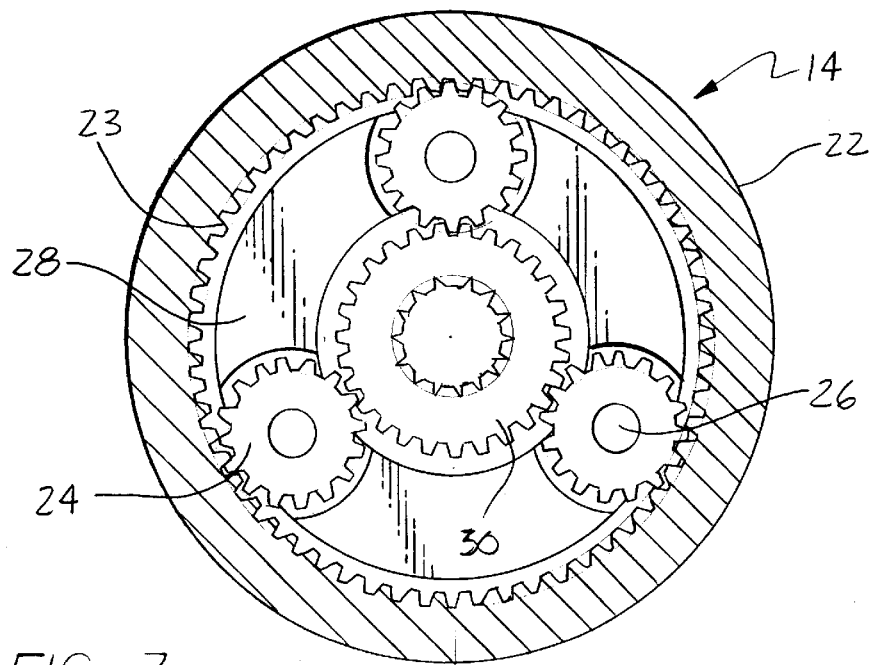
FIG. 3 is a cross-section view of a planetary differential gear set of the hydraulic transmission pump assembly of the present invention.

The hydraulic transmission pump assembly of the present invention is generally indicated as 10, in FIG. 1 when like numerals are used to describe like structure throughout the figure. The hydraulic transmission pump assembly 10 includes an electric motor generally indicated at 12, differential gear set assembly generally indicated at 14, and a hydraulic pump generally indicated at 16. The differential 14 is in the form of a planetary-type gear set. With reference to FIGS. 1 and 3, the differential 14 is mounted to a support structure 18 and includes an input gear 20 operatively coupled to a ring gear 22. Motive rotational power is provided to the input gear 20 from a power input of the vehicle's engine. Ring gear 22 has internal teeth 23 adapted to mesh with a plurality of planetary gears 24. The planetary gears 24 are mounted on individual stub shafts 26 that are fit within a carrier frame 28. The planetary gears 24 also mesh with a singular central sun gear 30. In the preferred embodiment, the planetary gear carrier frame 28 is of a two-piece design press-fit together on the stub shafts 26 over and partially encapsulating the sun gear 30. Sun gear 30 is splined to a central shaft 32 that interconnects the differential 14 and the electric motor 12.

The transmission pump, generally indicated at 16, is mounted to another support member 34. The pump support member 34, in combination with pump bore member 50 and pump end member 36 comprises the pump body, generally indicated at 40. As shown in FIG. 1, pump support member 34 is in alignment with support member 18 such that pump body 40 and differential 14 are brought into alignment and cooperative interconnection along longitudinal axis "A" when these portions of the present invention are assembled. Those having ordinary skill in the art will appreciate that the support members 18 and 34 depicted in the figures may include any convenient structural member commonly associated with the transmission or surrounding vehicle structure and that the support members 18 and 34 per se, as illustrated in the figures, form no part of the present invention. In the preferred embodiment, the transmission pump 16 is gerotor type pump having a gear set comprised of a first or inner pumping gear pumping element 42 having external teeth 44 and a second or outer pumping gear pumping element 46 having internal teeth 48.

Figure 2:
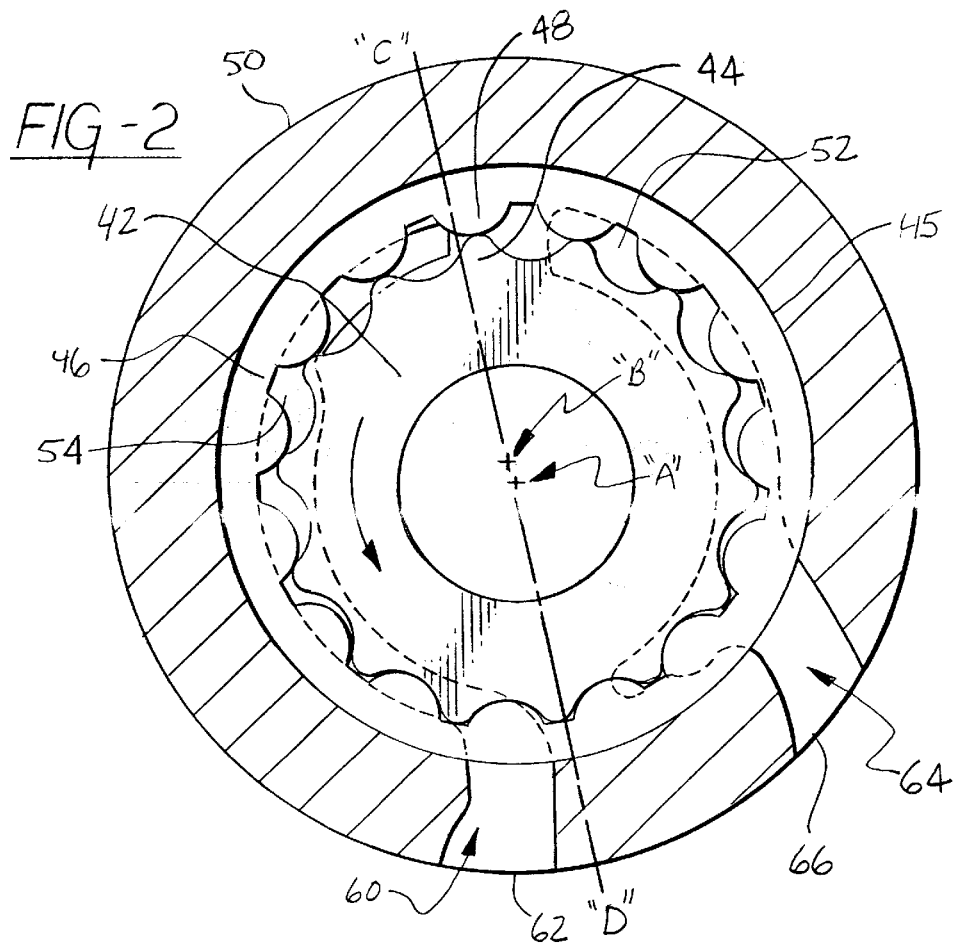
FIG. 2 is a cross-section view of a gerotor pump of the hydraulic transmission pump assembly of the present invention.

Referring now to FIGS. 1 and 2, the outer surface of the outer gear pumping element 46 is smooth finished and is disposed within bore opening 45 of pump bore member 50 in a close-tolerance, but rotatable fit. The number of external teeth 44 in the inner gear pumping element 42 is one less than the number of teeth 48 in the outer gear pumping element 46. The inner gear pumping element 42 is disposed within the outer gear element in such a manner that all the teeth 44 and 48 are in some form of continuous contact, from fully engaged to almost disengaged.

As best shown in FIG. 2, outer gear pumping element 46 is disposed within the pump bore member 50 on a radial axis "B". The inner gear pumping element 42 is disposed within the outer gear element inline with central axis "A". Radial axis "B" is eccentric to the central axis "A" and thereby outer gear pumping element 46 is offset relative to the radial axis of the inner gear pumping element 42. The bore opening 45 of pump bore member 50 is centered on axis "B" which accommodates the offset axial displacement of the outer gear pumping element 46. In this manner, as the inner gear member 42 rotates about axis "A", it drives outer gear pumping element 46 in the bore opening 45, such that the meshing of the teeth 44 and 48 creates spaces between the gear teeth that define pumping chambers 52 and 54, which expand and contract respectively as the elements rotate. As further shown in FIG. 2, as the gear elements rotate, their teeth pass through a line shown as "C-D". Line C-D is drawn through the axes "A" and "B" and indicates the radial points in the rotation of the gear members 42 and 46 at which the teeth 44 and 48 are at their most open and most fully engaged, respectively. In other words, the spaces between the teeth transition from expanding chambers 52 to contracting chambers 54, and vice versa, as the teeth of the gear set pass through the respective "C" and "D" radial points of their rotation. Within pump bore member 50 and pump end member 36, an inlet passage 64 and an inlet port 66 are machined, in a known manner, through to an area that meets the meshing teeth at a point in their rotation where they form expanding chambers 52. The pump bore member 50 and the pump end member 36 further have an outlet passage 60 and outlet port 62 also machined, in a known manner, through to an area that meets the meshing teeth where they are forming contracting chambers 54. It should be appreciated by those with ordinary skill in the art that inlet port 66 and outlet port 62 are, by some known manner, in fluid connection with ATF lines (not shown), which would allow distribution and delivery of ATF throughout the transmission as required.

As shown in FIG. 1, the electric motor, generally indicated at 12, is disposed upon the pump support member 34 on the opposite side of the support member from the pump body 40. The pump body 40, differential 14, and electric motor 12 are all brought into alignment and cooperative interconnection along longitudinal axis "A" when these portions of the present invention are assembled. The drive shaft of electric motor 12 serves as the common central shaft 32 of the present invention. The common shaft 32 has a splined area 38 on its circumference that engages the sun gear 30 of the differential 14. Additionally, the inner gear pumping element 42 of the pump 16 has an extended sleeve 39 that engages the carrier frame 28 of the differential gear set 14 at 41. The electric motor 12 is thereby interconnected to the inner gear pumping element 42 of the pump 16 through the sun gear 30, planetary gears 24, and carrier frame 28 of the differential 14.

In the preferred embodiment, two operational modes exist. The first operational mode is contemplated when a flow of ATF for operation of the transmission is required yet the vehicle's engine is off or at a below idle condition where an insufficient supply of ATF is available through the mechanical connection to the power input from the engine. In this first mode, with the vehicle engine off or at below idle, a line pressure regulator signals an electronic vehicle control system that ATF flow is below a required threshold. The vehicle control system, or a line pressure regulator then energizes the electric motor 12. The electric motor 12 spins its output shaft 32, which, through its interconnection to the inner gear pumping element 42 of the pump 16 through the sun gear 30, planetary gears 24, and carrier frame 28 of the differential 14, drives the pump 16 to produce a pressurized ATF flow.

This occurs as the inner gear pumping element 42 rotates, driving the outer gear pumping element 46. ATF, which is supplied to the inlet port 66 and inlet passage 64 of the pump 16, flows into the open expanding chambers 52 between the gear teeth 44 and 48. The expanding chambers 52 pass the ATF, by their rotation in the pump body 40, past axial point "C" at which the gear teeth 44 and 48 begin to mesh together. The gear teeth 44 and 48 then displace the ATF into the outlet passage 60 and outlet port 62 as they rotate toward axial point "D" and mesh closer, contracting the chambers 54, thereby creating a positive pressure and pumping the ATF out. A line pressure regulator (not shown) will provide an input to the vehicle control system to regulate the operation of the electric motor 12 and thereby control the ATF pressure to the transmission.

In one non-limiting embodiment, the system may be configured to switch the electric motor 12 simply on and off in response to sensed ATF delivery. In another non-limiting embodiment the electric motor 12 may be driven at variable speeds, rather than on or off, to control ATF delivery. It should be appreciated that in this operational mode, when the vehicle engine is off or at below idle speeds, and the output shaft 32 of the electric motor 12 causes the sun gear 30 and the carrier frame 28 of the differential 14 to spin that, by the nature of the planetary gear set, the planet gears 24 in the carrier frame 28 both revolve and rotate about the sun gear 30 without imparting force on the ring gear 22.

The second operating mode is contemplated when a flow of ATF for operation of the transmission is required and the vehicle's engine is running at or above an idle condition. With the engine running at or above idle, the input gear 20 and thereby the ring gear 22 of the differential 14 will be driven by the operatively connected power input from the vehicle engine. In this second mode, two functional operations occur simultaneously. Primarily, the torque input from the vehicle engine to the differential ring gear 22 causes the planetary gears 24 and the carrier frame 28 to rotate. As shown in FIG. 1, the carrier frame 28 is operatively coupled to the inner gear pumping element 42 of the transmission pump 16, so that the rotation imparted to the carrier frame 28 drives the transmission pump 16 thereby providing a pressurized volume of ATF to the transmission. As discussed previously, pump operation through the vehicle's engine input will flow excessive amounts of ATF above the idle level, so that a line pressure regulator, or regulator valve, elsewhere in the vehicle transmission, will route the excess flow back to the sump.

Secondarily, as described generally above, the torque input from the vehicle engine that causes the differential ring gear 22, the planetary gears 24, and the carrier frame 28 to rotate, also causes a rotation of the sun gear 30. The sun gear 30, as shown in FIG. 1, is operatively connected to the common central shaft 32, thereby causing rotation of the shaft 32. As previously described, the common central shaft 32 is functionally the extended output shaft of the electric motor 12.

It should be appreciated by those having ordinary skill in the art, that when the electric motor 12 is off (i.e., the windings of the motor are non-energized) and the shaft 32 of the motor is mechanically rotated, that the motor 12 then electrically functions as a generator. This occurs due to the inverse nature of electric motors, in which, as the wound magnetic armature on the shaft of an electric motor is turned, a magnetic field is set up within the motor's field windings, which produces, or generates, an electrical current. In this manner, at vehicle engine idle and above, the electric motor 12 of the present invention functions as a generator, creating electrical current from the mechanical energy imparted to its shaft 32 from the vehicle's engine through the differential gear set 14. This generated electrical current is fed back to the vehicle electrical system to either charge the battery or assist in operating other electrically actuated components associated with the vehicle.

The present invention is also directed toward a method of providing hydraulic power to an automotive transmission. The method includes the steps of providing a pump 16 which is operatively actuated about a central axis "A" as defined by a common driven shaft 32, providing an electric motor 12 which is electrically connected to the electrical system of an automobile, and providing a differential gear assembly 14 interposed between a power input 20 and the electric motor 12. The method also includes the steps of controlling the operation of the differential gear assembly 14 such that the differential gear assembly 14 causes the pump 16 to be driven by the electric motor 12 when the automotive engine is operating below a predetermined RPM, and controlling the differential gear assembly 14 such that it causes both the pump 16 and the electric motor 12 to be driven by the power input 20 when the automotive engine is operating above a predetermined RPM such that the electric motor 12 functions as a generator to provide electric power back to the automobile electrical system during specific times of motor vehicle operation.

Therefore, in summary, the preferred invention provides two operational modes. The first mode utilizes the electric motor 12, through the differential gear set 14, to drive the transmission pump 16, which provides regulated ATF flow to the transmission, when the vehicle's engine is off or in a below idle condition. The second mode, utilizes a power input from the vehicle's engine, through the differential gear set 14, to drive the transmission pump 16, which provides ATF flow to the transmission, when the vehicle's engine is at or above idle condition. Concurrently in the second mode, the differential 14 allows the excess mechanical power from the engine to be converted into useable electrical energy by diverting the excess mechanical energy to the electric motor 12.

Since the differential gear set 14 is operatively coupled to the vehicle engine, such that either the engine or the electric motor 12 can selectively drive the transmission pump 16, variations in the gear ratios within the design of the differential gear set 14 provide for other embodiments. By way of example, whereas the differential gear set 14 of the preferred embodiment allows that the vehicle engine power input provide all the required power at idle or above with the electric motor 12 off; in another non-limiting embodiment, the differential gear set 14 may be designed so as to only take a portion of the drive force for operating the transmission pump 16 from the vehicle engine, the remaining force would be taken from the electric motor 12. Specifically, the differential gear set ratios could be designed so engine power input to the transmission pump 16 would meet all possible lubrication, actuation and cooling requirements of the transmission only when the engine is at a high or maximum RPM. Thus, the electric motor 12 would be called on to provide the majority of the required motive force, through the differential gear set 14, for the transmission pump 16 with only minimal or supplemental input coming from the coupling with the engine. As such, no or very little excess in ATF flow would ever occur, since the power input from the electric motor 12 could be closely controlled by a line pressure control module. This would also preclude the necessity of recovering excessive mechanical energy from the engine and converting it to electrical energy.

By way of another example, the differential gear set 14 could be designed so that the transmission pump 16 would be driven by the vehicle engine so as to meet all possible lubrication, actuation and cooling requirements of the transmission when the engine reaches some intermediate RPM value between engine idle and maximum. This would require that the electric motor 12 provide some portion of the required drive force, through the differential gear set 14, up to the point the line pressure control module senses an excess in pressure (from both the electric motor and vehicle engine) and turns off the electric motor 12. As such, this would reduce the amount of excess ATF flow and still allow a conversion of excess mechanical energy from the engine operation of the transmission pump 16 to electrical energy by the electric motor 12 during portions of the operation range of the vehicle.

Accordingly, the present invention is a method and an apparatus for providing a transmission pump for a hydraulic transmission pump having a differential actuation, which overcomes the drawbacks of conventional designs which cannot provide proper ATF flow to the transmission when the engine is off or below idle speed. Additionally, the present invention is more efficient than the prior art as it provides the required, regulated ATF flow anytime the engine is at idle or above, while concurrently converting any excess applied engine power into usable electrical energy that is fed back to the vehicle electrical system. Furthermore, these objectives are achieved with the method and apparatus of the present invention in an efficient, cost effective and relatively simple manner.

The invention has been described in an illustrative manner. It is to be understood that the terminology that has been used is intended to be in the nature of words of description rather than of limitation. Many modifications and variations of the invention are possible in light of the above teachings. Therefore, within the scope of the appended claims, the invention may be practiced other than as specifically described.

We claim:

1. A hydraulic transmission pump assembly comprising:
a pump adapted to provide fluid under pressure to predetermined components in a transmission;
an electric motor operatively coupled to said pump; and
a differential gear assembly interposed between an engine and said electric motor, said differential gear assembly acting to divide engine torque between said pump and said electric motor at engine speeds above a predetermined level thereby providing fluid under pressure to the transmission and driving said electric motor to generate electricity, said electric motor operable to drive said pump at engine speeds below said predetermined level thereby providing fluid under pressure to the transmission during this operating condition.

2. A hydraulic transmission pump assembly as set forth in claim 1 wherein said pump is a gerotor type pump having an inner pumping gear element including external teeth and an outer pumping gear element having internal teeth wherein the number of external teeth of said inner pumping gear element in one less than the number of said internal teeth of said outer pumping gear element such that said external gear teeth of said inner pumping gear element mesh with said internal teeth of said outer pumping gear element to provide a pumping action therebetween thereby providing fluid under pressure to the transmission.

3. A hydraulic transmission pump assembly as set forth in claim 2 wherein said inner pumping gear element is operatively disposed on a common driven shaft defining a central pump axis, said outer pumping gear element defining an axis which is offset relative to said central pump axis so that said internal and external teeth of said inner pumping gear element and said outer pumping gear element respectively define pumping chambers that expand and contract as said gear elements rotate relative to one another.

4. A hydraulic transmission pump assembly as set forth in claim 3 wherein said pump further comprises a pump body having an inlet and an outlet port adapted to take in a fluid media at a first lower pressure through said inlet port and delivering the fluid media through said outlet port at a second higher pressure.

5. A hydraulic transmission pump assembly as set forth in claim 4 wherein said pump body comprises an inlet passage operatively connected to said inlet port and an outlet passage operatively connected to said outlet port such that said inlet passage delivers fluid media at said first lower pressure to said expanding pumping chambers and said outlet passage receives fluid media at said second higher pressure from said contracting pumping chambers.

6. A hydraulic transmission pump assembly as set forth in claim 1 wherein said differential gear assembly includes an input gear operatively coupled to the engine, a ring gear operatively coupled to said input gear and a sun gear operatively coupled to said common driven shaft and operatively interconnected in driven relationship with said ring gear.

7. A hydraulic transmission pump assembly as set forth in claim 6 wherein said differential gear assembly further includes a carrier having a plurality of planetary gears operatively disposed within said carrier.

8. A hydraulic transmission pump assembly as set forth in claim 7 wherein said plurality of planetary gears are disposed within said carrier on a respective plurality of stub shafts said planetary gears interposed in meshing relationship between said sun gear and said ring gear.

9. A hydraulic transmission pump assembly as set forth in claim 6 wherein said differential, said pump, and said electric motor are concomitantly disposed along a common driven shaft and are operatively interconnected together.

10. A hydraulic transmission pump assembly as set forth in claim 9 wherein said electric motor has an extended output shaft adapted to serve as said common driven shaft and that is operatively connected to said sun gear of said differential while operatively passing through said inner pumping gear element of said pump.

11. A hydraulic transmission pump assembly as set forth in claim 10 wherein said differential, said pump, and said electric motor are concomitantly disposed along said extended output shaft of said electric motor such that said output shaft passes through said inner pumping gear element of said pump and operatively connects to said sun gear of said differential gear assembly, said sun gear operatively connected to said inner pumping element of said pump.

12. A hydraulic transmission pump comprising:
a planetary gear set differential adapted to accept and transfer rotational power from both an engine of a motor vehicle and an electrical motor;
a gerotor pump adapted to accept rotational power from said differential and provide a volume of pressurized hydraulic fluid to a transmission of a motor vehicle; and
a said electric motor adapted to provide rotational power to said differential.

13. A hydraulic transmission pump as set forth in claim 12 wherein said electric motor further comprises an extended output shaft adapted to serve as a common central shaft, said shaft operatively connected to said gerotor pump and said differential.

14. A hydraulic transmission pump as set forth in claim 12 wherein said planetary gear set differential includes a sun gear operatively disposed in meshing relationship to a plurality of planetary gears mounted on stub shafts within a carrier, said planetary gears further interposed in meshing relationship to a ring gear, said ring gear operatively coupled to an input gear.

15. A hydraulic transmission pump as set forth in claim 14 wherein said input gear is operatively coupled to the engine.

16. A hydraulic power supply as set forth in claim 15 wherein said gerotor pump includes a gear set having an inner pumping gear element having external teeth and an outer pumping gear element having internal teeth.

17. A hydraulic power supply as set forth in claim 16 wherein said gerotor pump is operatively connected to said electric motor and said planetary gear set differential is operatively connected to said gerotor pump such that said extended shaft of said electric motor passes through said inner pumping gear element of said gerotor and operatively connects to said sun gear of said planetary gear set differential.

18. A hydraulic transmission pump assembly as set forth in claim 17 wherein said inner pumping gear element is interposed in meshing relationship with said outer pumping gear element, said inner pumping gear element operatively disposed on a central pump axis defined by said common central shaft, said outer pumping gear element operatively disposed on an axis that is offset relative to said central pump axis so that rotation of said inner and outer pumping gear elements, relative to one another, creates gaps between said internal and external teeth which define expanding and contracting pumping chambers.

19. A hydraulic transmission pump assembly as set forth in claim 18 wherein said pump further comprises a pump body having an inlet passage operatively connected to an inlet port and an outlet passage operatively connected to an outlet port such that said inlet passage delivers fluid media at said first lower pressure to said expanding pumping chambers and said outlet passage receives fluid media at said second higher pressure from said contracting pumping chambers.

20. A method of providing hydraulic power to an automotive transmission, the method comprising the steps of:
providing a pump which is operatively actuated about a central axis as defined by a common driven shaft;
providing an electric motor which is electrically connected to the electrical system of an automobile;
providing a differential gear assembly interposed between a power input and the electric motor;
controlling the operation of the differential gear assembly such that the differential gear assembly causes the pump to be driven by the electric motor when the automotive engine is operating below a predetermined RPM, and that the differential gear assembly causes both the pump and the electric motor to be driven by the power input when the automotive engine is operating above a predetermined RPM such that the electric motor functions as a generator to provide electric power back to the automobile electrical system during specific times of motor vehicle operation.

* * * * *